UNITED STATES PATENT OFFICE.

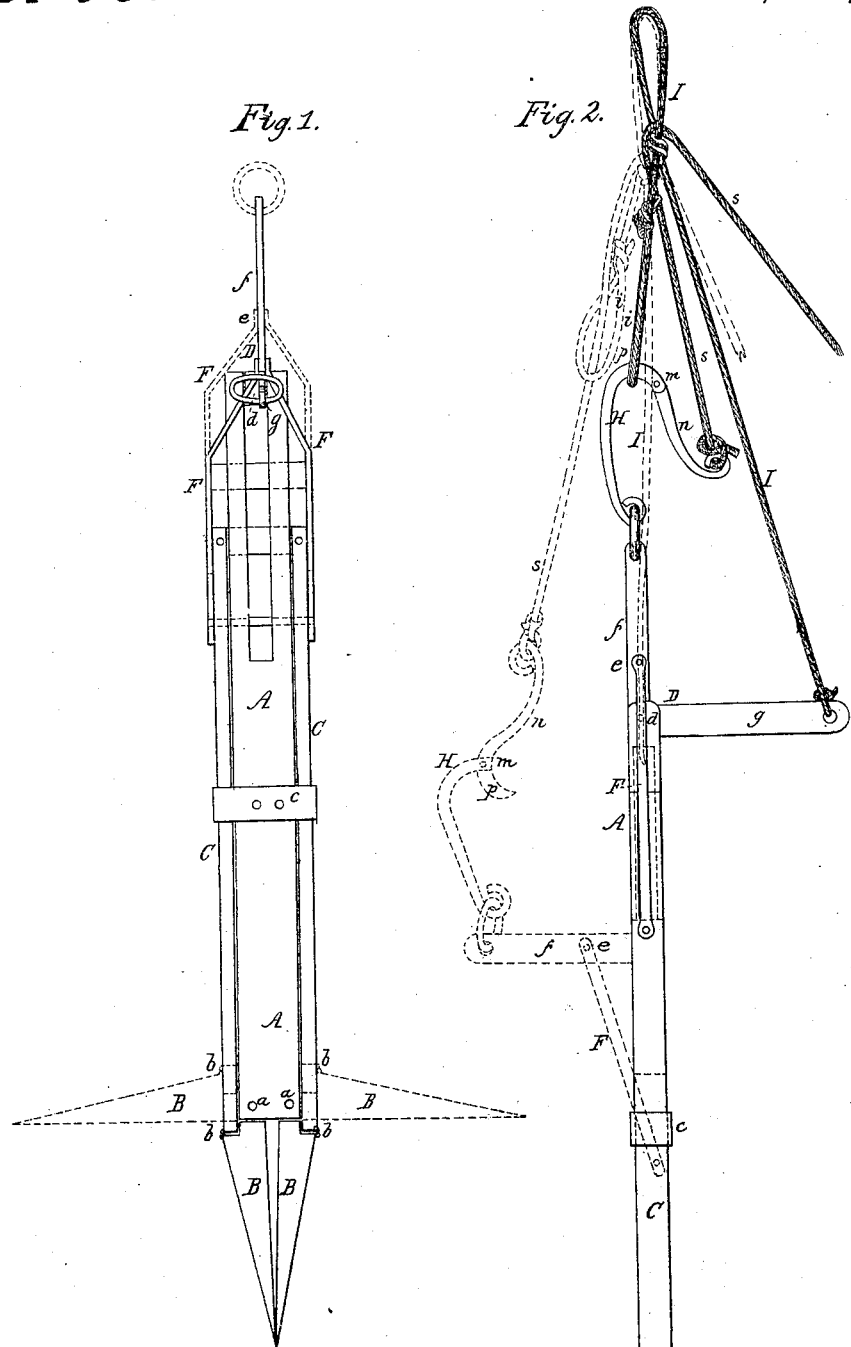

JOHN K. O'NEIL, OF KINGSTON, NEW YORK.

IMPROVEMENT IN HORSE HAY-FORKS.

Specification forming part of Letters Patent No. 53,660, dated April 3, 1866.

*To all whom it may concern:*

Be it known that I, JOHN K. O'NEIL, of Kingston, in the county of Ulster and State of New York, have invented an Improved Hay-Elevator; and I do hereby declare that the following is a full and exact description thereof, reference being had to the accompanying drawings, making part of this specification.

Figure 1 is a side view of the instrument; Fig. 2, an edge view thereof, representing, also, so much of the tackle as is necessary to indicate the mode of operation.

Like letters designate corresponding parts in both figures.

To the central or main bar or shaft, A, at its lower end, two or more barbs, B B, are hinged or jointed at $a\ a$. Each barb also has a side bar, C, hinged or jointed to it, as at $b$. The side bars, C C, have a sliding motion at the sides or edges of the main bar, A, being kept in place at the top by a band, $c$, or its equivalent. When the side bars, C C, are slid down they swing the two barbs B B together, as shown by black lines in Fig. 1, so that their points come together and compose substantially a single point, which enters the hay to be lifted; but when the side bars are drawn up as far as permitted in relation to the main bar or shaft A, then the barbs B B are thrown out horizontally or sidewise, substantially as shown by red lines in Fig. 1, in which position, being locked or secured, they will lift the hay above on raising the instrument by a rope or tackle.

The sliding movement of the side bars, C C, in relation to the central or main bar, A, is produced by means of a right-angled or bent lever, D, pivoted at its angle $d$ to the upper end of the said central or main bar; and at a point, $e$, on one of its arms $f$ about as far from the pivot-point $d$ as the side bars are required to slide on the main bar, to operate the barbs B B, it is pivoted to the connecting-rods F F, which themselves are pivoted, respectively, to the side bars, C C. When the arm $f$ of the bent lever D is vertical, as indicated by black lines in Fig. 2, the side bars, C C, are raised sufficiently to bring the barbs into a horizontal position. In that position the other arm, $g$, of the lever is horizontal, as indicated in the same figure; but when the arm $g$ is raised to a vertical position, and the arm $f$ is swung down to a horizontal position, as indicated by red lines in Fig. 2, the side bars are moved down so as to close the barbs together.

To the upper end of the arm $f$ a hook, H, is linked, and to the upper end of the arm $g$ a tackle-rope, I, is secured. The rope I is provided with a branch loop, eye, or ring, $i$, which, when the hook H is hooked into it, suspends the instrument by the arm $f$, that, being necessarily brought to a vertical position by the weight of the instrument, opens the barbs B B, whereby the hay is lifted; and the connecting-rods F F, in that position, being vertical, or in a line with the side bars, C C, and lever-arm $f$, act as locks to hold the barbs B B out in a horizontal position. The whole arrangement is clearly shown by black lines in Fig. 2. But by disengaging the hook H from the loop or ring $i$ the instrument becomes suspended directly by the tackle rope or cord I through the arm $g$, which is thus brought into a vertical position, thereby sliding down the bars C C and closing the barbs together, so as to discharge the hay therefrom, as shown by red lines in Fig. 2. The rope I is connected with a pulley or tackle-fall above the connection of the loop or ring $i$.

In order to disengage the hook H from the loop or ring $i$ by an automatic action, or from a distance, the hook H itself is jointed at $m$, substantially as shown in Fig. 2. The swinging part $n$ has an overlapping portion, $p$, conforming in shape with the bend of the hook, so that when the part $n$ is brought down into the proper position to form the hook into proper shape the hook will hold firmly; but on raising the swinging part $n$, its overlapping portion $p$ throws the loop or ring $i$ out of the hook and disengages it therefrom, as indicated by red lines in Fig. 2. The part $n$ is raised by pulling a cord, $s$, connected with it at its outer end and extending thence up by or through the tackle.

The operation of the angular or bent lever D and its tackle, and of the connecting-rods F F, is equally applicable to the movement of grapples, which grasp the hay between them, the only variation from the arrangement above described being the interchange of the hook H and tackle-rope I on the lever-arms $f\ g$, so as to reverse the movements of the side bars, C C, since the motions of the grapples are the opposite to those of barbs, as above described.

What I claim as my invention, and desire to secure by Letters Patent, is—

1. The right-angled or bent lever D, for producing the sliding movements of the side bars on the main bar, to open and close the barbs B B, arranged and operating substantially as herein specified.

2. The arrangement and combination of the operating tackle and angular lever in such a manner as to shift the suspension of the instrument from one arm of the angular lever to the other, substantially as and for the purpose herein specified.

3. The jointed hook H, constructed, arranged, and operating in combination with the angular lever and operating tackle, substantially as and for the purpose herein set forth.

The above specification of my improved hay-elevator signed by me this 13th day of January, 1866.

JOHN K. O'NEIL.

Witnesses:
J. S. BROWN,
WM. F. BROWNE.